United States Patent [19]

Besche et al.

[11] Patent Number: 4,662,405
[45] Date of Patent: May 5, 1987

[54] FLEXIBLE HOSE

[75] Inventors: Anton Besche, Korbach; Rolf Hecker, Waldeck-Freienhagen; Klaus Schwarze, Korbach, all of Fed. Rep. of Germany

[73] Assignee: Continental Gummi-Werke Aktiengesellschaft, Hanover, Fed. Rep. of Germany

[21] Appl. No.: 865,920

[22] Filed: May 14, 1986

Related U.S. Application Data

[63] Continuation of Ser. No. 693,009, Jan. 18, 1985, abandoned.

[30] Foreign Application Priority Data

Jan. 20, 1984 [DE] Fed. Rep. of Germany ....... 3401931

[51] Int. Cl.$^4$ ............................................. F16L 11/08
[52] U.S. Cl. ..................................... 138/125; 138/124
[58] Field of Search ............... 138/121, 122, 124, 125, 138/126, 127, 143, 144, 153; 174/24, 68 C, 70 C, 98, 109; 428/36

[56] References Cited

U.S. PATENT DOCUMENTS

| 83,031 | 10/1868 | Bishop | 138/125 X |
|---|---|---|---|
| 3,463,197 | 8/1969 | Slade | 138/125 |
| 3,479,670 | 11/1969 | Medell | 138/125 X |
| 3,481,368 | 12/1969 | Vansickle et al. | 138/125 |
| 3,604,461 | 9/1971 | Matthews | 138/125 X |
| 4,431,031 | 2/1984 | Ettlinger | 138/127 X |
| 4,553,568 | 11/1985 | Piccoli et al. | 138/125 |
| 4,585,035 | 4/1986 | Piccoli | 138/126 X |

Primary Examiner—Charles E. Phillips
Assistant Examiner—Mark Thronson
Attorney, Agent, or Firm—Becker & Becker, Inc.

[57] ABSTRACT

A flexible, very high pressure hose as a flexible conducting member in hydraulic systems. The wall of the hose contains filamentary load-carrying cords which are embedded in two or more layers. The load-carrying cords are combined to form a plurality of strips which cross one another or are braided with one another. The present invention deviates from the heretofore known symmetrical arrangement where the strips of a given layer have the same number of load-carrying cords in both directions, and instead provides an asymmetrical layer construction including strips which in one direction have a different number of load-carrying cords than do the strips which extend in the opposite direction. While the local resistance to pressure remains the same, the advantages of the present invention are distinct improvements, primarily in the flexibility and the service life of the novel hoses.

6 Claims, 3 Drawing Figures

FLEXIBLE HOSE

This application is a continuation of application Ser. No. 693,009, filed Jan. 18, 1985, now abandoned.

BACKGROUND OF THE INVENTION

1. Field of the Invention

The present invention relates to a flexible hose, of rubber or rubber-like synthetic material, having a plurality of helically twisted, filamentary load-carrying cords which are disposed in one or more plies or layers, are homogeneous, and are the same size; each layer comprises strips which cross one another or are braided with one another; those strips which cross one another extend at the same but opposite angles relative to the longitudinal axis of the hose; each of the strips contains a plurality of load-carrying cords.

2. Description of Prior Art

Depending upon the conditions which exist in a given field of application, varying demands are made of commercial hoses as flexible transmission elements for conveying liquids and gases, and for transmitting pressures. Generally, resistance to pressure within certain limits at least nearly constant volume is required also under a dynamically pulsating inner pressure; depending upon the circumstances, sufficient ability to bend, mechanical stability and resistance to wear, lack of susceptibility to chemical attack, electrical conductivity, and other criteria also can be important. There is generally possible without difficulty to cope with high inner hose pressures by the appropriate selection and orientation of the load-carrying cords. However, in this situation, since the load-carrying cords are packed as tightly together as possible in order to prevent the elastomeric inner hose from being pressed through between the load-carrying cords, hoses reinforced in this way at the same time obtain an undesirable stiffening, which further also adversely affects dynamic physical properties thereof. Particular unfavorable conditions result in this connection from the use of steel wires as load-carrying cords, the use of which cannot be dispensed with in order to cope with extremely high pressure loads, for example in hoses for hydraulic brake, lifting, and steering systems.

An object of the present invention is to improve the bending characteristic and dynamic physical properties of high and very high pressure hoses without compromising the required provision of load-carrying cord layers.

BRIEF DESCRIPTION OF THE DRAWINGS

This object, and other objects and advantages of the present invention, will appear more clearly from the following specification in conjunction with the accompanying drawing, in which.

SUMMARY OF THE INVENTION

Figure 1:
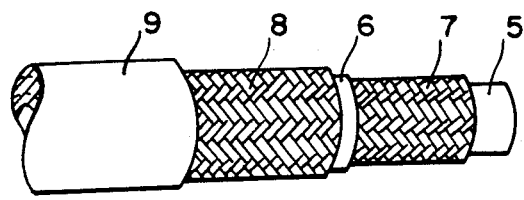
FIG. 1 is a fragmentary perspective view of an asymmetrical layer construction for a flexible hose in accordance with the present invention.
Figure 2:
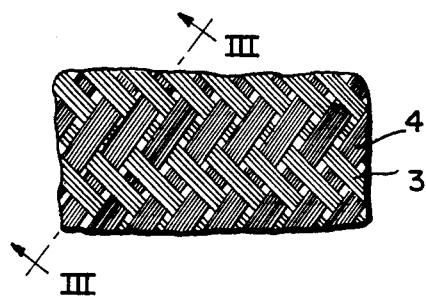
FIG. 2 is a schematic partial plan view of an asymmetrical layer construction for the flexible hose having at least one braided layer of one embodiment of the inventive hose.
Figure 3:
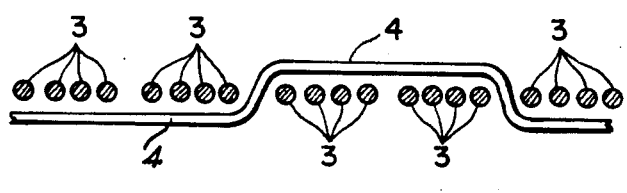
FIG. 3 is a diagrammatic sectional view taken along line III-III in FIG. 2 and showing reinforcing strips which extend in opposite directions.

The flexible hose of the present invention is characterized primarily in that the strips of a given layer, which extend in one direction, contain a greater number of load-carrying cords than do the strips of the same layer which extend in the opposite direction. The difference in the number of load-carrying cords in the strips of a given layer can be in a range between 1 to $N-1$, with N designating the larger number of load-carrying cords. If, as is generally the case, the load-carrying cords in two or more separate layers are embedded one above the other in the wall of the hose, it is advisable, pursuant to the present invention, to reverse the count relationship from layer to layer.

The asymmetrical hose construction of the present invention leads to surprising and unexpected results, the advantageous effects of which are not forseeable. The strips, which are disposed in one given direction, have a narrower width, which results from the reduced number of load-carrying cords, and permits a tight interweaving of both strip systems, as a result of which a high degree of closeness is again achieved, and hence the desired reliability against the elastomeric hose material itself penetrating under the effect of extremely high inner pressures is achieved. The lower number of filaments or wires in the opposite direction additionally results in a more advantageous utilization of the strength of the filaments or wires and at the same time establishes an extraordinary flexibility for the inventive hoses. Heretofore known hoses with a symmetrical reinforcement have an unavoidable forced deformation of the individual load-carrying cords in the overlapping strips; this deformation is practically entirely avoided by the arrangement of the present invention. Since to the same extent shearing movements of the strips relative to one another under the effect of changing pressure loads is also precluded, the otherwise frequently observed wear, primarily of the wires at the edges, which wear causes premature failure of the hose, is eliminated. Due to the inventive features, and furthermore due to the improved potential for the strips to move relative to one another, one can anticipate a considerably longer servie life of the hoses, even under difficult conditions of use.

Pursuant to further specific features of the present invention, the strips which contain the greater number of load-carrying cords can be disposed on the hose with a greater prestress than are the strips which extend in the opposite direction.

Alternatively, those strips which contain the lower number of load-carrying cords can be disposed on the hose with a lesser prestress than are the strips which extend in the opposite direction.

The load-carrying cords can be steel wires, or they can be woven or high-strength synthetic filaments.

DESCRIPTION OF PREFERRED EMBODIMENTS

Referring now to the views of drawings in detail, a construction of a very high pressure hose is shown having two steel wire braided members which are separated from one another by an intermediate rubber layer. Each of these braided members comprises wire or cord-containing strips 3, 4 which intersect one another, and extend at an angle of about 54° to the longitudinal direction of the hose. Each of the strips 3 comprises four individual wires or filaments, whereas each strip 4 comprises seven such wires or filaments; the individual wires or filaments have the same denier.

The present invention is, of course, in no way restricted to the specific disclosure of the specification and drawing, but also encompasses any modifications within the scope of the appended claims.

What we claim is:

1. A braided high pressure flexible hose, of rubber or rubber-like elastomeric synthetic material, said hose having an asymmetrical layer construction, said construction consisting of a plurality of strengthening layers, each of said strengthening layers consisting of filamentary load-carrying cords which are homogenous and which are the same size; each strengthening layer including intersecting strips which cross one another in a braided relationship with one another; said intersecting strips extendng at the same but opposite angles relative to the longitudinal axis of said hose; each of said intersecting strips consisting of a plurality of said load-carrying cords;

wherein intersecting strips of a given layer disposed in one given direction have a narrower width than strips of said same given layer disposed in an opposite direction and wherein said intersecting strips of said given layer extending in said one given direction contain a lower number of said load-carrying cords than said intersecting strips of said given layer disposed in the opposite direction, said narrower width resulting exclusively from the reduced number of load-carrying cords in said strips of said given layer disposed in said one given direction;

said strips being tightly interwoven as a result of which a high degree of closeness is achieved and hence a high reliability is achieved against the rubber or rubber-like elastomeric synthetic material itself penetrating through the strengthening layers under the effect of an extremely high pressure within the flexible hose; said strips allowing for interaction asymmetrically relative to one another so as to improve the hose's bending characteristics and dynamic physical properties.

2. The hose of claim 1, in which the difference in the number of said load-carrying cords in said strips ranges from 1 to $N-1$, where N is the greater number of said load carrying cords.

3. The hose of claim 2, in which said count relationship of said load-carrying cords is reversed from layer to layer.

4. The hose of claim 3, in which said strips which contain the greater number of said load-carrying cords are disposed on said hose with a greater prestress than are said strips which extend in the opposite direction.

5. The hose of claim 3, in which said load-carrying cords are steel wires.

,11

6. The hose of claim 3, in which said load-carrying cords are high-strength synthetic filaments.

* * * * *